(12) United States Patent
Ikegami

(10) Patent No.: US 6,468,067 B1
(45) Date of Patent: Oct. 22, 2002

(54) COMPOSITE EXTRUDING APPARATUS OF RUBBER AND METHOD OF EXTRUDING UNVULCANIZED RUBBER

(75) Inventor: Hiroshi Ikegami, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/659,117

(22) Filed: Sep. 13, 2000

(30) Foreign Application Priority Data

Sep. 16, 1999 (JP) ............................................. 11-261377

(51) Int. Cl.$^7$ ................................................ B29B 7/42
(52) U.S. Cl. ............................ 425/209; 366/77; 366/87
(58) Field of Search ............................. 366/77, 79, 87, 366/99, 157.2, 318, 83–86, 190; 425/209

(56) References Cited

U.S. PATENT DOCUMENTS

| | | | |
|---|---|---|---|
| 1,595,470 A | * | 8/1926 | Johnson |
| 2,535,287 A | * | 12/1950 | Gliss |
| 2,692,405 A | * | 10/1954 | Gayler |
| 2,767,437 A | * | 10/1956 | Marshall |
| 3,711,067 A | * | 1/1973 | Kovacs |
| 4,170,446 A | * | 10/1979 | Schutz et al. |
| 4,171,193 A | | 10/1979 | Rahlfs |
| 4,318,677 A | * | 3/1982 | Ullrich et al. |
| 4,321,229 A | * | 3/1982 | Blakeslee, III et al. ........ 366/79 |
| 4,336,213 A | * | 6/1982 | Fox |
| 4,358,262 A | * | 11/1982 | Herbert |
| 4,478,516 A | * | 10/1984 | Kessler |
| 4,501,498 A | * | 2/1985 | McKelvey |
| 4,642,040 A | * | 2/1987 | Fox |
| 4,707,139 A | * | 11/1987 | Valenzky et al. |
| 4,721,589 A | * | 1/1988 | Harris |
| 4,890,996 A | * | 1/1990 | Shimizu |
| 5,129,728 A | * | 7/1992 | Winstead ...................... 366/79 |
| 5,156,781 A | | 10/1992 | Bohm et al. |
| 5,267,847 A | * | 12/1993 | Bohm et al. .................. 366/77 |
| 5,304,053 A | * | 4/1994 | Gohlisch et al. |
| 5,310,256 A | * | 5/1994 | Boden |
| 5,372,418 A | * | 12/1994 | Biesenberger et al. |
| 5,378,415 A | * | 1/1995 | Gohlisch et al. |
| 5,567,463 A | * | 10/1996 | Schaaf |
| 5,824,735 A | | 10/1998 | Graab et al. |
| 5,941,634 A | * | 8/1999 | Tynan et al. ................... 366/79 |

FOREIGN PATENT DOCUMENTS

| | | | |
|---|---|---|---|
| DE | 93020 | * | 10/1972 |
| DE | 3133647 | * | 3/1983 |
| DE | 3833777 | * | 10/1990 |
| EP | 0305751 | | 3/1989 |
| EP | 0329810 | | 8/1989 |
| EP | 0512197 | | 11/1992 |
| JP | 54-32572 | | 3/1979 |
| JP | 58-24405 | * | 2/1983 |
| JP | 58-183210 | * | 10/1983 |
| JP | 5-116200 | | 5/1993 |
| JP | 7-108589 | | 4/1995 |
| JP | 8-244057 | | 9/1996 |
| JP | 10-166427 | | 6/1998 |

* cited by examiner

Primary Examiner—Charles E. Cooley
(74) Attorney, Agent, or Firm—Fulbright & Jaworski L.L.P.

(57) ABSTRACT

With the same screw diameter as in conventional screw extruders, the screw length is reduced, whereby the material residue is reduced, the throughput is increased, the screw motive power is reduced, the temperature control is facilitated to prevent rubber scorching, and extrusion molding of a vulcanizalbe rubber composition is made possible at a lower temperature. In a composite extruding apparatus of rubber, a gear pump 20 is connected to a tip end of a screw extruder 10 via a screen mesh 14 having a breaker plate 15, and a die head 24 is connected to an ejecting side of the gear pump 20, wherein the screw extruder 10 plasticizes a fed rubber composition G mainly by friction with an inner surface of a barrel 12 and by heating from outside and extrudes the rubber composition G from the screen mesh 14 to a space on an inlet side of the gear pump 20; the screen mesh 14 rectifies the rubber composition G passing through the screen mesh 14 towards the gear pump 20 while stirring and plasticizing the rubber composition G by friction and shear; and the gear pump 20 further stirs and platicizes the ruber composition G, which is fed to the space on the inlet side, by shear and compression, and gives a forcing pressure to the die head 24.

9 Claims, 2 Drawing Sheets

COMPOSITE EXTRUDING APPARATUS OF RUBBER AND METHOD OF EXTRUDING UNVULCANIZED RUBBER

BACKGROUND OF THE INVENTION

1. Field of the Invention

The present invention relates to a composite extruding apparatus of rubber including a screw extruder and a gear pump, and is suitable for use by connecting it to a die head for extrusion-molding of the rubber. Further, the present invention relates also to a method of extruding unvulcanized rubber with the use of the composite extruding apparatus.

2. Description of the Background Art

As a method of producing an extrusion-molded product of rubber such as a tire tread, a weather strip, a door seal, or a hose of an automobile, there are known a method in which a vulcanizable rubber composition obtained by kneading a rubber material with additives such as a reinforcing agent, a filler, a plasticizer, a vulcanizer, and a vulcanization promoter is fed to an extruder and extruded to a desired shape from the extruder via a die head, and vulcanized with a vulcanizing apparatus after being subjected to a lamination process or the like, such as in the case of a tire tread, or a method in which the vulcanizable rubber composition is guided to a vulcanizing apparatus for vulcanization after extrusion, and then is cut to a desired length to obtain a product, such as in the case of a weather strip.

Generally, a screw extruder is used for the above-mentioned extrusion. In this screw extruder, rubber is conveyed by a screw in a barrel, where the rubber is subjected to friction, shear, and compression between an inner surface of the barrel and an outer surface of the screw, whereby the rubber is self-heated and plasticized to have a viscosity that enables molding. In a conventional type extruder in which a die head is directly connected to the screw via a screen mesh, it has been considered that the longer the length L of the aforesaid screw is, the better it is, in view of the necessity of ensuring a predetermined molding pressure to the die head after the rubber passes through the screen mesh. In other words, it has been assumed that the screw must be provided with a feeding part, a compressing part, and a metering and discharging part, and hence the ratio L/D of the length L to the outer diameter D of the screw has been set to be within a range from 12 to 16 for a rubber at room temperature.

However, if the length of the screw is increased, it requires a larger motive force to that extent, and temperature control for heating and cooling will be required that respectively corresponds to the feeding part, the compressing part, and the metering and discharging part, thereby necessitating a complex temperature control mechanism. Moreover, even if the length of the screw is increased as described above, a plasticizing effect comparable to that of a Banbury mixer cannot be obtained. In order to improve the degree of plasticization with the use of the conventional type extruder, the speed of the screw rotation must be increased. This raises the temperature of the discharged rubber too much and generates scorching of the rubber, making the rubber unmoldable and decreasing the throughput. In addition, there is a problem that, by increasing the length of the screw, the material will remain in a larger amount in changing the lots.

On the other hand, it is known in the prior art that, by connecting a gear pump to a tip end of a screw extruder, the pressure of feeding rubber to a die head is maintained constant to enable precision molding (publication of Japanese Patent application No. 05-116200/1993(A1) (which has the same contents as U.S. Pat. No. 5,156,781)). This known art is constructed in such a manner that the metering and discharging part among the feeding part, the compressing part, and the metering and discharging part of the screw is transferred to the gear pump to allow the two functional areas of the feeding and heating part and the compressing part to remain in the screw, and that the pressure loss generated at the screen mesh and the breaker plate, which is a supporting body of the screen mesh, between the screw extruder and the gear pump is restrained to the minimum extent. Therefore, the total length of the screw has been such that the aforesaid ratio L/D is within a range from 4.5 to 8.5, and also the shape of the rubber passageways before and after the screen mesh and the breaker plate has been complex.

SUMMARY OF THE INVENTION

The present invention provides a composite extruding apparatus of rubber in which, as compared with the known composite type extruding apparatus using a gear pump in combination, the ratio L/D is further reduced to decrease the screw length while maintaining the same screw diameter, whereby the material residue is reduced. The present invention also provides a composite extruding apparatus of rubber in which the throughput can be increased while maintaining the same screw diameter, and the screw motive force is reduced. Further, the present invention provides a composite extruding apparatus of rubber in which the temperature control is facilitated to prevent rubber scorching, and extrusion molding of a vulcanizable rubber composition is made possible at a low temperature. The present invention provides a composite extruding apparatus in which the shape of the rubber passageways before and after the screen mesh can be simplified. In another aspect, the present invention provides a method of extruding an unvulcanized rubber with the use of the aforesaid extruding apparatus.

Thus, the present invention provides a composite extruding apparatus of rubber in which a gear pump is connected to a tip end of a screw extruder via a screen mesh having a breaker plate, and a die head is connected to an ejecting side of the gear pump, wherein the screw extruder plasticizes a fed rubber composition mainly by friction with an inner surface of a barrel and by heating from outside and extrudes the rubber composition from the screen mesh to a space on an inlet side of the gear pump; the screen mesh rectifies the rubber composition passing through the screen mesh towards the gear pump while stirring and plasticizing the rubber composition by friction and shear; and the gear pump further stirs and plasticizes the rubber composition, which is fed to the space on the inlet side, by shear and compression, and gives a forcing pressure to the die head.

In other words, the screw extruder used in the present invention needs to be substantially provided only with the feeding part among the feeding part, the compressing part, and the metering and discharging part, which are needed in conventional extruding apparatus, thereby eliminating the need for the compressing part and the metering and discharging part. Therefore, the length of the screw can be reduced to a great extent while maintaining the thickness (D), thereby all the more simplifying the temperature control mechanism.

The ratio L/D of the length L to the outer diameter D of the aforesaid screw is preferably set to be within a range from 1 to 4, particularly within a range from 2 to 3. Further, it is sufficient that the aforesaid screw extruder can plasticize a rubber composition by heating, and can feed the rubber composition to the gear pump by the rotation of the screw against the resistance of the screen mesh, so that the screw extruder does not need a forcing pressure needed for the rubber composition to pass through the die head. Therefore, the driving motor of the aforesaid screw is reduced in scale as compared with conventional ones. However, if the aforesaid ratio L/D is less than 1, the plasticization by heating the rubber composition will be insufficient, whereas if the ratio exceeds 4, the length will be too large to be economical.

Further, the screen mesh equipped with the breaker of the present invention rectifies the rubber composition, which passes through the screen mesh and its supporting breaker plate towards the gear pump, while stirring and plasticizing the rubber composition with friction and shear. Namely, the rubber composition ejected from the screw extruder and having a twisted shape is passed through the screen mesh and the holes of the breaker plate, whereby the aforesaid rubber composition is stirred and further plasticized by friction and shear at that time while being accompanied by a pressure loss. Therefore, it is sufficient that the rubber passageways before and after the aforesaid screen mesh has a straight tubular shape, and the bore diameter of the rubber passageways can be made equal to the diameter of the outlet of the screw extruder, thereby all the more simplifying the structure of the rubber passageways.

The gear pump connected to the outlet side of the aforesaid screen mesh having a breaker perform two functions of the compressing part and the metering and discharging part of a conventional type screw extruder by shearing and compressing and further stirring and plasticizing a fed rubber composition by meshing of gears, and sending the rubber composition to the die head with a predetermined pressure. The gear pump to be used can be a general gear pump for high viscosity; however, it is preferably a gear pump such that a thread groove is provided at a bearing part to allow the scorched rubber generated at an end surface of the gear to be automatically discharged in accordance with the rotation of the shaft of the gear.

When a rubber composition is fed to a screw extruder in the aforesaid composite extruding apparatus of rubber, the rubber composition is sent to the outlet side of the barrel in accordance with the rotation of the screw, and is heated at the same time by friction with the inner surface of the barrel as well as being heated and plasticized by a function of a heating medium flowing through the barrel and the screw shaft. The rubber composition that has reached the ejection outlet of the screw extruder is extruded towards the screen mesh and the breaker plate and receives shear and friction when passing through the screen mesh and the breaker plate, whereby the rubber composition is plasticized and at the same time stirred to fill a space on the feeding side of the gear pump in a state in which the pressure has been reduced by resistance when the rubber composition passes through the screen mesh and the breaker plate. The rubber composition fed to the gear pump receives shear and compression in accordance with the rotation of the gear pump to be further plasticized and stirred, and is sent to the die head with a predetermined pressure and speed to enable precision molding. In other words, in the apparatus of the present invention, plasticization of a vulcanizable rubber composition is carried out by a primary plasticization mainly owing to the function of the barrel and the screw of the screw extruder and the function of the screen mesh and the breaker plate, and a secondary plasticization in the gear pump, whereby the vulcanizable rubber composition is made moldable. Further, the rubber composition is stirred by the screw, the screen mesh, the breaker plate, and the gear pump.

In the composite extruding apparatus of rubber according to the present invention, the height of the flight (flight depth) formed on the aforesaid screw is preferably within a range from $(1/5)D$ to $(1/15)D$, more preferably within a range from $(1/7)D$ to $(1/12)D$.

By adopting a screw having a flight height lower by 10 to 20% than the fight height of the conventional screw, the torque applied to the screw can be reduced even in the case of extruding an unvulcanized rubber having a high viscosity, thereby reducing the electric power consumption accompanying the extrusion. Moreover, the screw can be rotated at a high speed and can effectively carry out the plasticization as well as increasing the speed of extrusion.

Further, in the composite extruding apparatus of rubber according to the present invention, the aforesaid screw is preferably provided with a plurality of flight streaks.

By adopting the above-mentioned construction, the stirring efficiency can be improved, the screw can be rotated at a high speed, and the extrusion speed can be increased as compared with a conventionally-used screw with one or two streaks.

The method of extruding an unvulcanized rubber according to the present invention is characterized by use of a composite extruding apparatus of rubber as described herein.

Since the screw length is small, the material residue is reduced, and hence the amount of generated wastes is small. Further, the electric power consumption is small, the throughput is large, and the temperature control is easy, so that extrusion molding of a vulcanizable rubber composition with restrained generation of scorching rubber can be carried out at a low temperature.

In the method of extruding an unvulcanized rubber according to the present invention, the aforesaid screw is preferably rotated at a rotation number within a range from 10 rpm to 120 rpm.

The extruding apparatus used in the method of extruding an unvulcanized rubber according to the present invention has a short screw length and can prevent scorching caused by local heat generation as compared with conventional extruders. As a result, rotation at a high speed increased by 25 to 100% is possible, thereby enabling extrusion molding at a high speed. In the extrusion method of the present invention, the compression ratio is preferably within a range from 1:1.1 to 1:1.3, which is smaller than 1:1.6 of the conventional extruder.

DESCRIPTION OF THE PREFERRED EMBODIMENTS

Hereafter, preferred embodiments of the present invention will be described with reference to the attached drawings.

Figure 1:
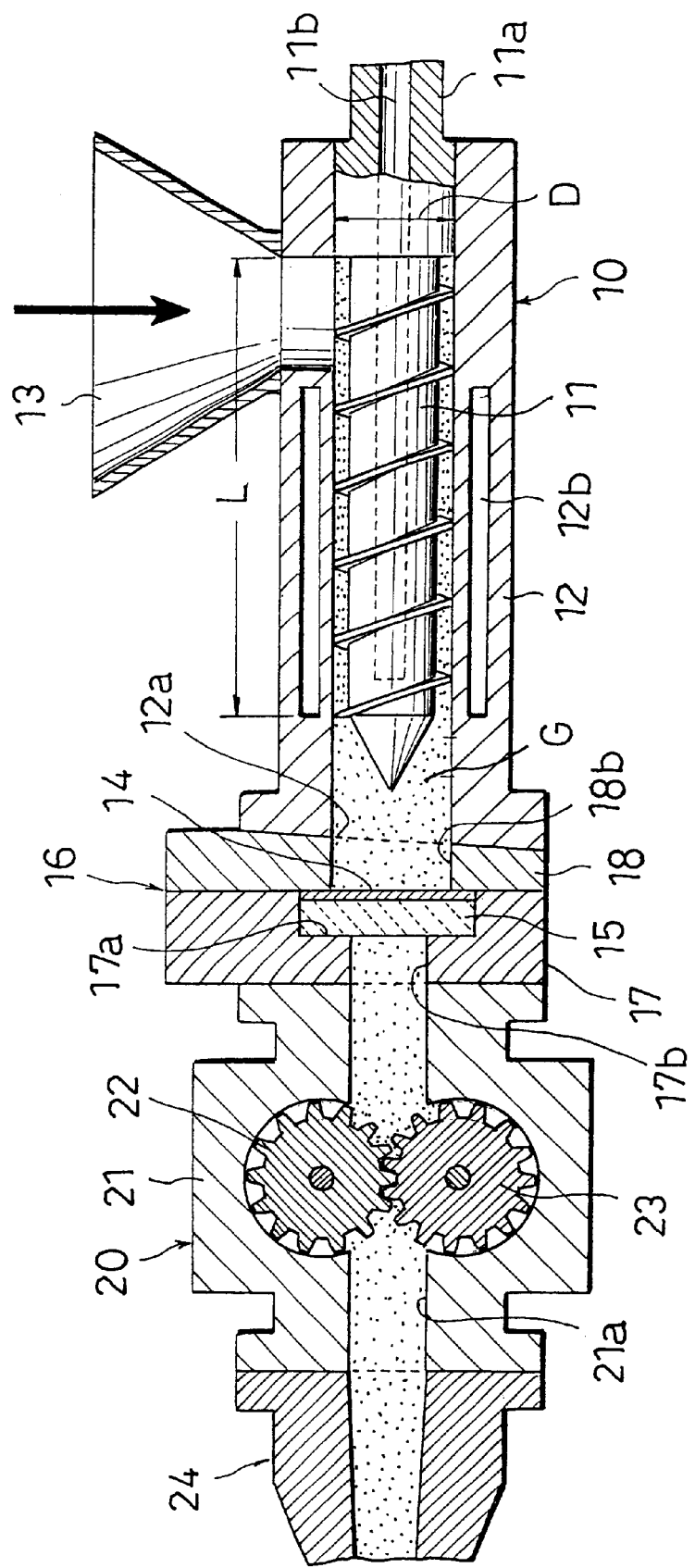
FIG. 1 is a cross section view illustrating an example of an extruding apparatus of the present invention.

Referring to FIG. 1, a screw extruder 10, an extruding screw 11, a driving shaft 11a, a barrel 12, an ejection outlet 12a, and a hopper 13 for introducing a vulcanizable rubber composition are shown. The ratio L/D of the length L to the outer diameter D of the above-mentioned screw 11 is within a range from 2 to 4. Heating medium passageways 11b and 12b for temperature control are provided in the screw 11 and the barrel 12, respectively, by an ordinary method. Further, the end surface on the ejecting side (the left end surface in FIG. 1) of the above-mentioned barrel 12 is slightly tilted with respect to the vertical (plumb) plane.

A screen mesh 14 for removal of foreign substances and a breaker plate 15 for supporting the screen mesh 14 are disposed on the ejecting side of the above-mentioned screw extruder 10. The screen mesh 14 and the breaker plate 15 are held within a breaker supporting block 16 in a state of being superposed one on the other, and are connected to the ejecting side of the above-mentioned screw extruder 10. The above-mentioned breaker supporting block 16 is constructed with a supporting plate 17 on the front side (gear pump side) and a pressing plate 18 on the rear side (screw extruder side). The aforesaid screen mesh 14 and breaker plate 15 are inserted in a recess 17a disposed in the supporting plate 17, and are fixed by the pressing plate 18. A rubber passageway 17b having the same bore diameter as the rubber passageway 21a of a later-mentioned gear pump 20 is disposed in the supporting plate 17; and a rubber passageway 18b having the same diameter as the ejecting outlet of the screw extruder 10 is disposed in the pressing plate 18. Further, the back surface of the pressing plate 18 (the surface on the screw extruder side) is formed to have a wedge-like cross section of a tilted surface parallel to the end surface on the ejecting side of the above-mentioned barrel 12, and is connected between the end surface on the ejecting side of the above-mentioned barrel 12 and the later-mentioned gear pump 20 by press-fit.

The gear pump 20 is composed of a body 21 and a pair of upper and lower gears 22, 23. A rubber passageway 21a is disposed linearly with the same diameter as the rubber passageway 17b of the above-mentioned supporting plate 17 respectively on the feeding side and the opposite discharging side of the gears 22, 23. The rubber passageway 21a in the above-mentioned body 21 is brought into communication with the ejecting outlet 12a of the screw extruder 10 via the rubber passageways 17b, 18b in the breaker supporting block 16 when the above-mentioned breaker supporting block 16 is connected between the gear pump 20 and the aforesaid screw extruder 10 by press-fit from above. Further, a die head 24 is connected to the discharging side of the gear pump 20.

In the above-mentioned structure, the screw extruder 10 and the gear pump 20 are fixed onto a supporting frame (not illustrated) at a predetermined interval. The breaker supporting block 16, in which the screen mesh 14 and the breaker plate 15 are set in advance, is fixed by press-fit between the screw extruder 10 and the gear pump 20; the screw 11 and the barrel 12 of the screw extruder 10 are heated to a predetermined temperature; the screw 11 and the gear pump 20 are rotated at a predetermined speed; and a vulcanizable rubber composition having a predetermined viscosity is introduced into the hopper 13, whereby the rubber composition G is sent forward by the screw 11, heated and plasticized by heat transfer from the shaft surface of the screw and from the inner surface of the barrel 12 and by friction with the inner surface of the barrel 12, and proceeds towards the ejecting outlet 12a while being subjected to less compression compared to the conventional type screw extruder.

The rubber composition G subjected to the primary plasticization process by being heated in the above-mentioned screw extruder 10 enters the rubber passageway 18b of the breaker block 16 in a simple twisted state with little stirring, and then passes through the screen mesh 14 and the breaker plate 15, where the rubber composition G receives shear and compression to be plasticized by self-heating and is stirred and then passes through the rubber passageway 17b to enter the rubber passageway 21a on the feeding side of the gear pump 20. The rubber composition G that has filled the rubber passageway 21a on the feeding side receives the secondary plasticization process by shear and compression by meshing of the pair of upper and lower gears 22, 23 to be plasticized into a moldable state, and at the same time stirred to be sent to the die head 24 at a predetermined discharging speed via the rubber passageway 21a on the discharging side, thereby to be molded into a desired cross-sectional shape and extruded.

Figure 2:
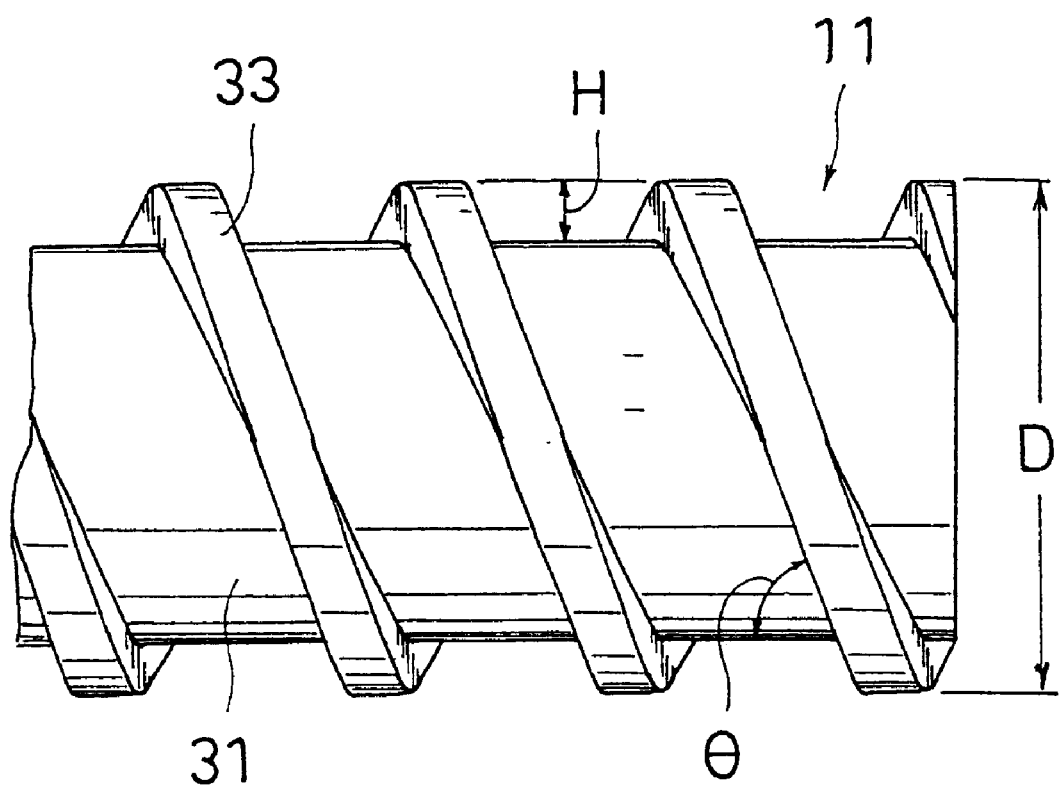
FIG. 2 is a side view illustrating a portion of an example of a screw.

FIG. 2 shows an example of a shape of a tip end of a screw suitable for the extruding apparatus of the present invention. The screw 11 includes a flight 33 formed thereon, and the height of the flight 33 formed together with the bottom 31 of the screw is H. In the present invention, it is preferable to satisfy the following relationship: $(1/15)D \leq H \leq (1/5)D$ as described before.

The flight 33 of the screw shown in FIG. 2 is made of one streak, and is formed continuously in a helical shape on the outer circumference of the screw. In the extruding apparatus of the present invention, it is also preferable if the screw is formed to have a plurality of flight streaks. A twin-streak type screw can be obtained by forming a flight having the same shape between the flights 33 of the screw of FIG. 2.

The composite extruder of the present invention is characterized in that the rubber throughput decreases little by disposing the gear pump 20. For example, in the case where an extruder having a 60 mm diameter screw 11 is used, the throughput in a state of open tip end of the extruder is 70 to 100 kg/hr; however, if a die head 24 and a die are mounted, the throughput decreases to 40 to 60 kg/hr though it depends on the type of rubber and the shape of the die. On the contrary, the composite extruding apparatus of rubber according to the present invention can achieve a throughput of 70 to 90 kg/hr.

The flight depth H and the flight angle θ are suitably set by taking into account the processing properties such as the type and viscosity of rubber to be extruded. The flight angle θ is within a range from 45° to 75°, and is set in accordance with the flight depth H. If $H=(1/10)D$ to $(1/11)D$, it is preferable that θ=50° to 55°, and if $H=(1/8)D$ to $(1/9)D$, it is preferable that θ=65° to 70°.

Further, in the composite extruder of the present invention, the compression ratio can be reduced, and the compression ratio can be set to be not more than 1.4, preferably not more than 1.3, more preferably not more than 1.2, as compared with the conventional extruders in which the compression ratio is around 1.6.

Since the compression ratio can be reduced as compared with the conventional extruders, the heat generation of rubber in the extruder can be restrained, thereby effectively preventing the scorching (burning) of rubber and achieving scale reduction of the driving motor of the extruder and reduction of the electric power consumption.

EXAMPLES

As a sample, a screw extruder 10 was fabricated in which a screw 11 had a length L of 240 mm, an outer diameter D of 60 mm, a ratio L/D of 4, a compression ratio of 1.23, and a bore diameter of an ejecting outlet 12a of 60 mm. A screen mesh 14, a breaker plate 15, a gear pump 20 ("the type for extruder" manufactured by Maag Co., Ltd. in Switzerland), and a die head 24 were connected to the screw extruder 10. A vulcanizable SBR-based and NR-based rubber composition G (having a Mooney viscosity ML1+4=90 to 30) was fed to mold a tire tread composition.

On the other hand, a conventional type screw extruder (screw length: 720 mm, outer diameter D: 60 mm, L/D: 12, compression ratio: 1.6, bore diameter of ejecting outlet: 60 mm) was prepared as a Comparative Example, and a die head 24 was connected to the screw extruder via the same screen mesh 14 and breaker plate 15 as mentioned above, to mold a tire tread composition similar to the above.

The performances of the Example and the Comparative Example were compared. In the Example, the amount of rubber fed till the rubber ejection of the screw extruder became stable at the time of the start of operation and the loss amount of material rubber remaining in the screw extruder at the time of the stop of operation were respectively reduced to less than 1/3 to 1/5, the temperature of the rubber ejected from the screw extruder decreased at least by 5° C., and further the electric power consumption of the screw extruder decreased by more than 30%, as compared with the Comparative Example.

As described above, according to the present invention, the screw extruder functions as the feeding part of a conventional type screw extruder, and the gear pump functions as the compressing part and the metering and discharging part of the aforesaid conventional type screw extruder. Since the screw is shortened, the material residue is reduced, the throughput is increased, the screw motive power is reduced, the temperature control is facilitated, extrusion-molding of a vulcanizable rubber composition is made possible at a low temperature to prevent scorching of rubber, and the shape of the rubber passageways before and after the screen mesh can be simplified.

What is claimed is:

1. A composite extruding apparatus for extruding rubber comprising a gear pump connected to a tip end of a screw extruder having a screw having a length L and an outer diameter D via a screen mesh having a breaker plate;

a die head connected to an ejecting side of the gear pump, wherein said screw extruder plasticizes a fed rubber composition substantially by friction with an inner surface of a barrel and by friction of said screw and by external heating and extrudes the rubber composition from said screen mesh to a space on an inlet side of said gear pump, said screen mesh rectifies the rubber composition passing through said screen mesh towards said gear pump while stirring and plasticizing the rubber composition by friction and shear, and said gear pump further stirs and plasticizes the rubber composition, which is fed to a space on the inlet side, by shear and compression, and gives a forcing pressure to said die head, the ratio L/D of said screw being from 1 to less than 3.

2. The composite extruding apparatus of claim 1, wherein said screw feeds the rubber and said gear pump compresses and meters and discharges the rubber.

3. A method of extruding an unvulcanized rubber comprising extruding rubber through the apparatus of claim 2.

4. A method of extruding unvulcanized rubber according to claim 3, wherein said screw is rotated at a rotation number within a range of from 10 rpm to 120 rpm.

5. A composite extruding apparatus for extruding rubber according to claim 1, wherein a height of a flight formed on said screw is within a range of from 1/5D to 1/15D.

6. A method of extruding an unvulcanized rubber comprising extruding rubber through the apparatus of claim 5.

7. A method of extruding unvulcanized rubber according to claim 6, wherein said screw is rotated at a rotation number within a range of from 10 rpm to 120 rpm.

8. A method of extruding an unvulcanized rubber comprising extruding rubber through the composite extruding apparatus of rubber according to claim 1.

9. A method of extruding an unvulcanized rubber according to claim 8, wherein said screw is rotated at a rotation number within a range from 10 rpm to 120 rpm.

* * * * *